(12) United States Patent
Felgenhauer et al.

(10) Patent No.: US 8,789,680 B2
(45) Date of Patent: Jul. 29, 2014

(54) DEVICE FOR PUSHING GLASS OBJECTS ONTO A CONVEYOR BELT

(75) Inventors: Benedikt Felgenhauer, Herford (DE); Matthias Hubner, Stadthagen (DE)

(73) Assignee: Heye International GmbH (DE)

( * ) Notice: Subject to any disclaimer, the term of this patent is extended or adjusted under 35 U.S.C. 154(b) by 0 days.

(21) Appl. No.: 13/500,986

(22) PCT Filed: Mar. 25, 2011

(86) PCT No.: PCT/EP2011/001496
§ 371 (c)(1),
(2), (4) Date: Apr. 9, 2012

(87) PCT Pub. No.: WO2011/160739
PCT Pub. Date: Dec. 29, 2011

(65) Prior Publication Data
US 2013/0087431 A1   Apr. 11, 2013

(30) Foreign Application Priority Data
Jun. 25, 2010  (DE) .................. 10 2010 025 168

(51) Int. Cl.
*B65G 25/00* (2006.01)
*B65G 47/04* (2006.01)
*C03B 9/453* (2006.01)

(52) U.S. Cl.
CPC ............... *B65G 47/04* (2013.01); *C03B 9/453* (2013.01)

USPC ............................ 198/430; 198/429; 198/598

(58) Field of Classification Search
CPC . B65G 25/00; B65G 47/82; B65G 2201/0244
See application file for complete search history.

(56) References Cited

U.S. PATENT DOCUMENTS

| | | | |
|---|---|---|---|
| 7,264,108 B2* | 9/2007 | Borsarelli et al. | 198/429 |
| 2005/0193773 A1* | 9/2005 | Winkelhake et al. | 65/239 |
| 2013/0153367 A1* | 6/2013 | Felgenhauer et al. | 198/518 |

FOREIGN PATENT DOCUMENTS

| | | | | |
|---|---|---|---|---|
| DE | 102004010238 B3 | 6/2005 | | |
| DE | 102004007507 A1 | 9/2005 | | |
| EP | 1577272 A2 * | 9/2005 | ............. | C03B 9/453 |
| EP | 1627858 A1 | 2/2006 | | |
| EP | 1886977 A1 * | 2/2008 | ............. | C03B 9/453 |

\* cited by examiner

*Primary Examiner* — Ramya Burgess
*Assistant Examiner* — Lester Rushin
(74) *Attorney, Agent, or Firm* — Fox Rothschild LLP

(57) ABSTRACT

A device for pushing glass objects onto a conveyor belt includes a pusher (5), which is supported on a crank arm (6) in such a way that it can be swiveled about an axis (7), which crank arm is in driving engagement with a first electric motor (1) by means of a shaft (12). A second electric motor (2) is in driving engagement with a sleeve (20) by means of a cantilever (18), in which sleeve the shaft (12) is mounted, wherein the shaft (12) can be swiveled about a central stationary axis (19). A third electric motor (3) is arranged to rotate the pusher about the axis (7).

20 Claims, 3 Drawing Sheets

DEVICE FOR PUSHING GLASS OBJECTS ONTO A CONVEYOR BELT

BACKGROUND

The invention relates to a device for pushing glass objects from a dead plate of a section of an I.S. (individual section) glassware forming machine onto a conveyor belt.

Devices of this type are used as pushers in the production of hollow glass articles. They are used to transfer the article, which has been removed from a blow mold and set down on a stationary dead plate, onto a conveyor belt moving continuously at a uniform speed. The articles must be positioned on the conveyor belt standing one behind the other and then move into a lehr. Since, in the case of IS (individual section) machines, the conveyor belt cooperates with a plurality of manufacturing stations, each of which is provided with a dead plate, the process of pushing the hollow glass objects must take place within a time interval which is dependent on the working cycle of the other manufacturing stations and the conveying speed of the belt, wherein the pushing action must also be applied in such a way as to avoid the hollow glass objects falling over or being damaged as well as to avoid imprecise positioning on the belt. At the end of the transfer movement each hollow glass article must stand in a defined position on the belt and move with, and at the same speed as, the belt.

A device of this type is known from DE 10 2004 010 238 B3. Here, a first lever, which can swivel at one of its ends about a vertical, fixedly disposed axis, supports, at its other end and also in such a way as to swivel about a vertical axis, one end of a second lever, on the other end of which a pusher fitted with three pushing fingers is mounted also to be able to swivel about a perpendicular axis. Three mutually independently controllable, fixedly disposed drives are assigned to the rotations of the first lever about the stationary axis, of the second lever with respect to the first lever and of the pusher with respect to the second lever, wherein from the superimposition of the three partial movements generated by these drives, a transfer curve beginning at a reception point on the dead plate and ending at a delivery point on the conveyor belt can be provided. The transfer of the rotational motions of the three drives via the levers as far as the pusher is effected by means of toothed belt transmissions, the operation of which is considered to be maintenance-intensive. A high level of complexity results from an initial assembly using hollow shafts which are inserted one inside the other and subsequent separation for the purpose of introduction into the respective component, the rotational speed of which is to be controlled.

A further comparable device is known from EP 1 627 858 B1. Here, a first lever, which can swivel at one of its ends about a vertical, fixedly disposed axis, supports, at its other end and also in such a way as to swivel about a vertical axis, one end of a second lever, on the other end of which a pusher is mounted, once again so as to swivel about a perpendicular axis. Mutually independently controllable drives, which may be fixedly disposed, are assigned to the rotations of the first lever about the stationary axis, of the second lever with respect to the first lever and to that of the pusher with respect to the second lever. In this embodiment the formation of a chain consisting of the three drives, the second lever, the first lever and the pusher appears to be comparatively elaborate, wherein at one end of this chain the three partial movements are introduced and transferred one after another into the said components, since e.g. numerous transmission stages are required merely for the transfer of the rotation—effecting the partial movement of the pusher—of the assigned stationary drive.

Since these devices are used under the operating conditions of hollow glass manufacturing, i.e. in an atmosphere characterized by heat, dirt and moisture, and in particular abrasive materials, then with regard to the expected standing time, but also with regard to maintenance costs, precautions for protection against these environmental influences are essential. However, this prior art discloses absolutely no measures leading to a solution to this problem.

SUMMARY OF THE INVENTION

The object of the invention is to improve a device of the type depicted in the introduction in terms of simple construction and more robust design. This object is achieved by the present invention providing a device for pushing glass objects from a dead plate of a section of an I.S. (individual section) glassware forming machine onto a conveyor belt which moves in a direction. The device includes a pusher for pushing the glass objects from the dead plate onto the belt and which is mounted on one end of a lever so as to be able to swivel about a first vertical axis. The other end of the lever is connected to a first shaft which is mounted so as to be able to swivel about a second vertical axis, and the first shaft is mounted to be able to swivel about a fixedly disposed third vertical axis of a rotatably mounted second shaft. The device further includes a first fixedly disposed electric motor which is in driving engagement with the first shaft, a second fixedly disposed electric motor which is arranged to swivel the first shaft about the third axis, and a third fixedly disposed electric motor which is arranged to rotate the pusher about the first axis relative to the lever. The lever includes a crank arm which is non-rotatably connected to the first shaft. The device further includes a push rod having one end connected in an articulated manner to the pusher at a distance from the first axis so as to be able to swivel about a fourth vertical axis, the other end of the push rod is in driving engagement with the third electric motor via a fifth vertical axis, forming a four-bar chain with the crank arm and the pusher.

The invention accordingly resides in the articulation of the pusher on a crank arm, wherein in order to carry out a swivel motion with respect to the crank arm, a push rod is provided which is in driving engagement with one of the three electric motors. The swivel axis of the pusher with respect to the crank arm, and the two axes about which the push rod is swivelably articulated at its two ends preferably extend in parallel with each other so that with very simple means a swivel motion is produced in a plane which can be defined by the crank arm and the pusher.

The features of another embodiment of the invention are directed at mounting the shaft which supports the crank arm and therefore the pusher, which is effected in a hollow shaft which, for its part, is mounted in a sleeve. The sleeve surrounding the hollow shaft is in turn mounted on a fixedly disposed shaft, a cantilever being disposed therebetween, which shaft is in driving engagement with an electric motor which therefore serves to produce an eccentric swivel motion of the sleeve about the axis of the fixedly disposed shaft. By means of the hollow shaft, a rotational motion about the axis of the sleeve is therefore superimposed on the rotational motion—initiated by the sleeve—about the axis of the said fixedly disposed shaft.

The features of still further embodiments are directed at the further construction of the driving engagement between the sleeve on the one hand and a fixedly disposed electric motor on the other hand. For this purpose, a first spur-gear transmission is provided, into which a toothed wheel is incorporated, which is mounted on the said fixedly disposed shaft so as to be able to rotate relative thereto.

In other embodiments, the features are directed at the further construction of the driving engagement between the shaft supporting the crank arm on the one hand and a fixedly disposed electric motor on the other hand. For this purpose a second spur-gear transmission is provided, into which a toothed wheel is also incorporated, which is mounted on the said fixedly disposed shaft so as to be able to rotate relative thereto.

An extremely space-saving construction for the device is achieved owing to the use of the said fixedly disposed shaft to mount transmission components of the two spur-gear transmissions and to drive the said crank arm about the axis thereof.

In another embodiment, the driven shaft of one of the three electric motors preferably extends coaxially to the said fixedly disposed shaft. Therefore, in order to introduce a rotational motion of the crank arm about the axis thereof, no intermediately disposed transmission components are required.

Since with this concept, as opposed to the prior art presented in the introduction, not too many rotational motions take place one inside another, it is possible to use robust bearings characterized by higher dynamic load ratings, so that a comparatively long service life is achieved.

The use of only two spur-gear transmissions already results in a very simple construction characterized by a reduced number of parts and therewith the advantage of lower costs for manufacturing and assembly.

Bearings which are subjected to a high level of heat can be formed as maintenance-free, easily exchanged dry slide bearings.

Other features of the invention are directed at the construction of a housing which houses the device apart from the pusher which protrudes at the top. The housing, which is formed e.g. with rotational symmetry with respect to the axis of the central fixedly disposed shaft, is closed at the top by a cover plate and consists of a pot-like upper part formed by a cover-like part at the bottom, from which upper part only the sleeve supporting the pusher protrudes, and of a lower part below the cover-like part, which is formed by a sheet metal hood and serves to receive the three electric motors. The pot-like upper part including the said cover part can consist of a cast material and this upper part serves to receive transmission parts and oil filling. This opens up the possibility of providing lubrication to increase the service life of the device. The lower part receiving the electric motors offers protection against environmental influences.

The features of yet more embodiments are directed at further advantageous embodiments of the device. However, by means of the housing and owing to the circumstance that this housing is disposed below the level of a dead plate, protection of the components of the device with respect to heat, dirt and moisture is provided.

BRIEF DESCRIPTION OF THE DRAWINGS

The invention is explained in more detail hereinunder with reference to the exemplified embodiment illustrated in the drawings in which.

DETAILED DESCRIPTION

Figure 1:
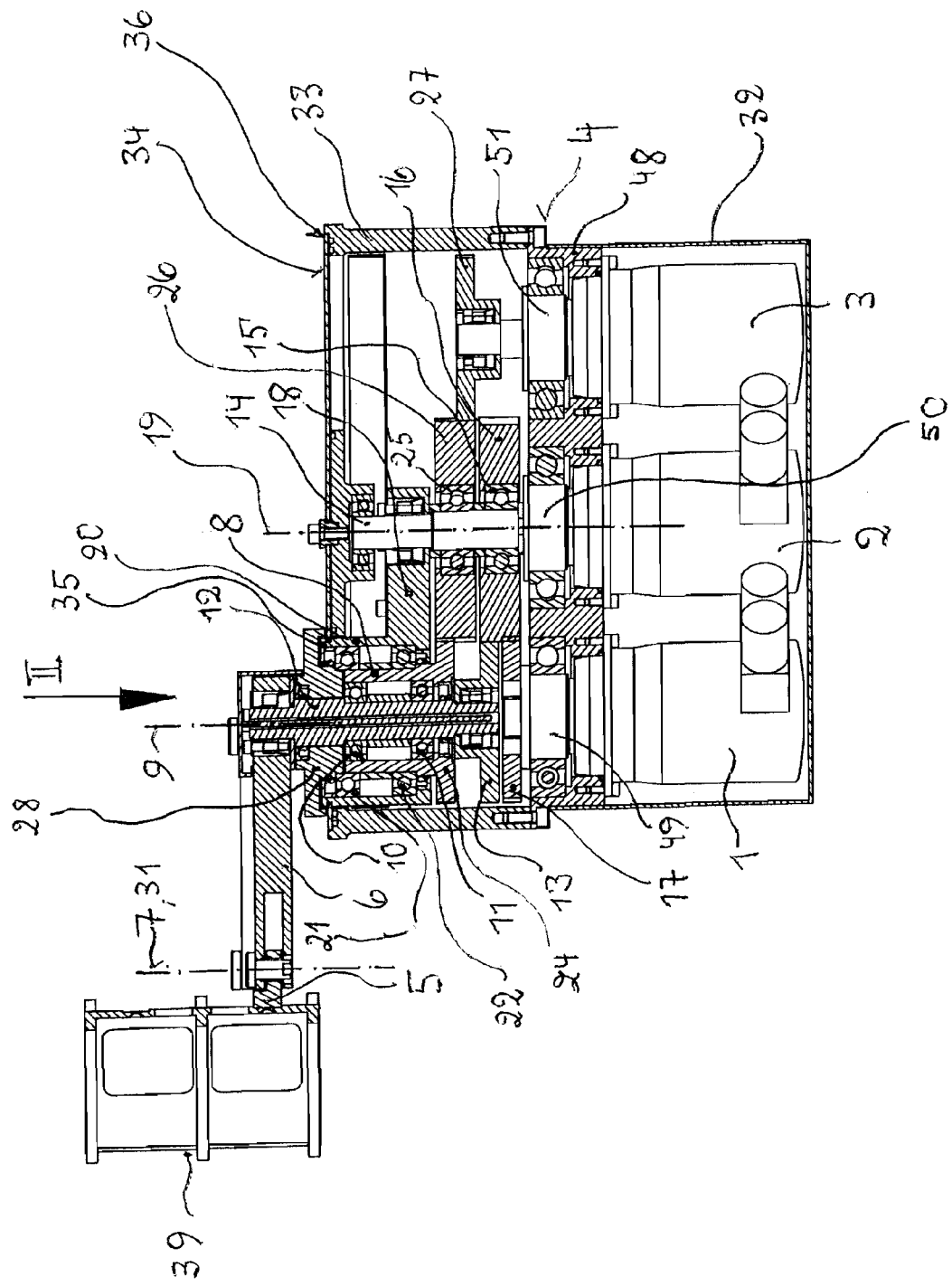
FIG. 1 illustrates the device in accordance with the invention in a vertical plane of cut.

The numerals 1 to 3 designate three electric motors fixedly disposed on the cover-like part 48 of a housing 4, which electric motors are intended to drive a pusher 5 in a manner to be described hereinunder, which pusher is mounted on a crank arm 6 so as to be able to swivel about a vertical axis 7 (a first axis), therefore to be able to swivel in a horizontal plane. The crank arm 6 is non-rotatably connected to a shaft 12 (a first shaft) mounted in a hollow shaft 8 about a vertical axis 9 (a second axis) by means of roller bearings 10, 11, on which shaft 12 a toothed wheel 13 is disposed in a non-rotatable manner. The toothed wheel 13 is engaged with a toothed wheel 16 which is mounted on a central, vertically extending shaft 14 (a second shaft) by means of a roller bearing 15 so as to be able to rotate with respect to this shaft, and which toothed wheel 16 is at the same time engaged with a toothed wheel 17 disposed on the driven shaft 49 of the electric motor 1. An assembly consisting, amongst other things, of the shaft 12, the toothed wheels 13, 17, the hollow shaft 8 and the sleeve 20 is therefore able to swivel about an axis 19 (a third axis).

The toothed wheels 13, 16, 17 form a first spur-gear transmission intended to transfer the output rotational speed of the electric motor 1 to the rotation of the shaft 12 about the axis 9.

The numeral 18 designates a cantilever which is non-rotatably connected to the shaft 14, is mounted to rotate about its axis 19 and, at its end remote from the axis 19, supports the sleeve 20, the axis of which extends coaxially to the axis 9. In this sleeve 20 the hollow shaft 8 is mounted via roller bearings 21, 22 so as also to rotate about the axis 9.

Figure 2:
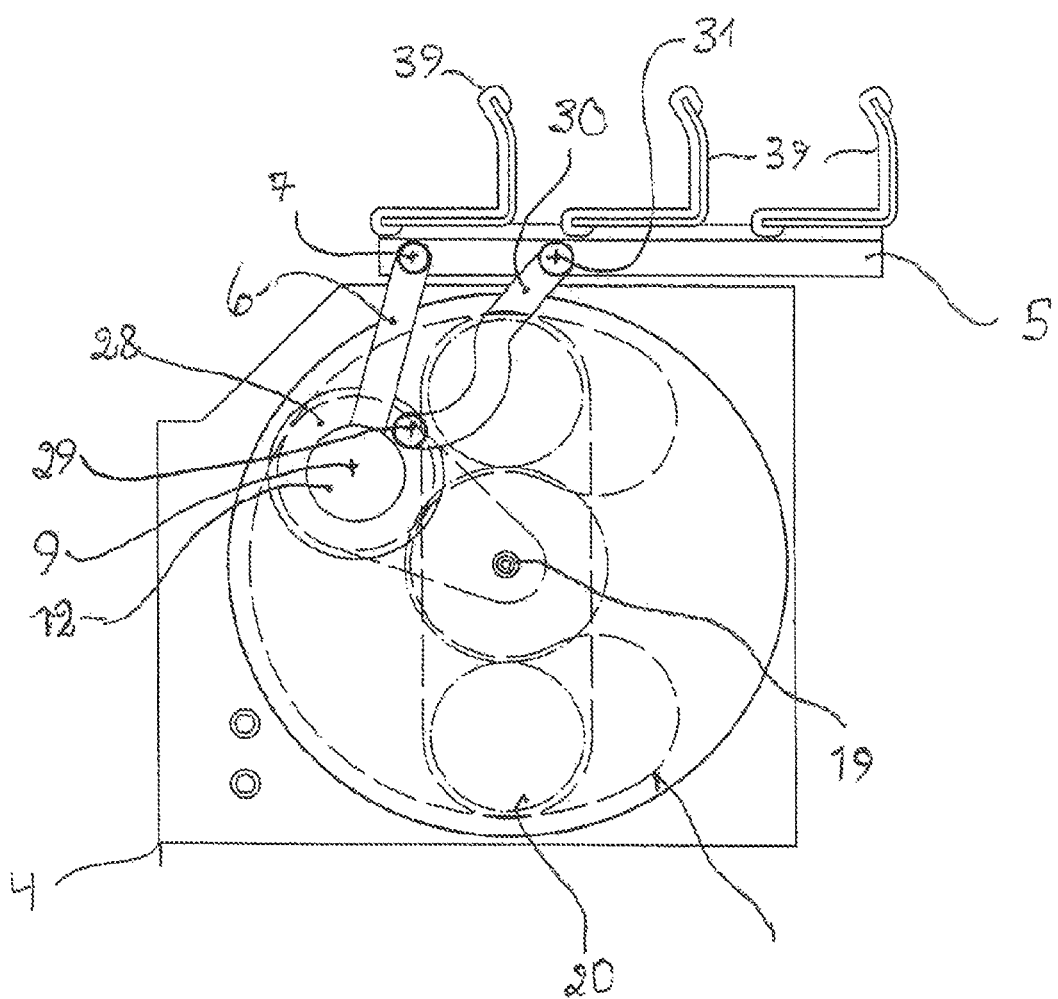
FIG. 2 illustrates a plan view of the device in accordance with arrow II of FIG. 1.

The electric motor 2 is connected directly to the shaft 14 via its driven shaft 50 and therefore serves to carry out a reciprocating rotational motion of the sleeve 20 about the central axis 19 within and along the region 23 illustrated in a dot-dash line in FIG. 2.

At its lower end, the hollow shaft 8 has a toothed crown 24 which is engaged with a toothed wheel 26 which is rotatably mounted on the central shaft 14 via a roller bearing 25 and which is in driving engagement via a further toothed wheel 27 with the driven shaft 51 of the electric motor 3.

The hollow shaft 8 is rigidly connected to an annular element 28 illustrated in FIG. 2, on which one end of a push rod 30 is mounted so as to be able to swivel about an axis 29 (a fifth axis) extending in parallel with the axis 9 (the second axis), the other end of which push rod is mounted about an axis 31 (a fourth axis) in parallel with the axis 29 and at a distance from the axis 7 on the pusher 5.

It will be recognized that the arrangement of the axes 7, 9, 29, 31 in connection with the crank arm 6, the annular element 28 and the pusher 5 form a four-bar chain by which a rotation of the annular element 28 about the axis 9 and relative to the shaft 12 supporting the crank arm effects a rotation of the pusher 5 about the axis 7 with respect to the crank arm 6.

The toothed wheels 27, 26 in conjunction with the toothed crown 24 form a second spur-gear transmission intended for transmission of the output rotational speed of the electric motor 3, so that by means of the driven shaft 51 of the third electric motor 3 a driving engagement for the swivel motion of the pusher 5 about the axis 7 is produced.

The housing 4 consists of the cover-like part 48 supporting the electric motors 1 to 3 and of a pot-like upper part 33 receiving the above-described transmission components, carrying an oil bath and preferably formed as a cast part. The part 48 releasably connected to the upper part 33 can also be formed as a cast part. A sheet metal hood 32 forming a lower part of the housing 4 and connected to the part 48 surrounds the three electric motors 1, 2, 3 and provides protection against environmental influences.

The numeral 34 designates a cover plate which is centered about the axis 19 and has an opening 35 in an edge region, through which the sleeve 20 extends. The sleeve 20 rotating about the axis 19 exerts an entrainment effect on the cover plate 34 which is in contact in its peripheral region, via a seal 36, with the edge of the upper part 33.

The sleeve 20 is also closed at the upper side in a sealed manner with respect to the environment by the annular element 28 and the shaft 12.

The inner chamber of the housing 4 is therefore disposed so as to be protected with respect to the environment.

Only the system consisting of the annular element 28 and the shaft 12 and supporting the crank arm 6 and the push rod 30 extends out of the cover plate 34 at the upper side. Three pushing fingers 39 intended to push glass objects from a dead plate 37 onto a conveyor belt 38 are disposed on the pusher 5 in a manner which is known per se.

Figure 3:
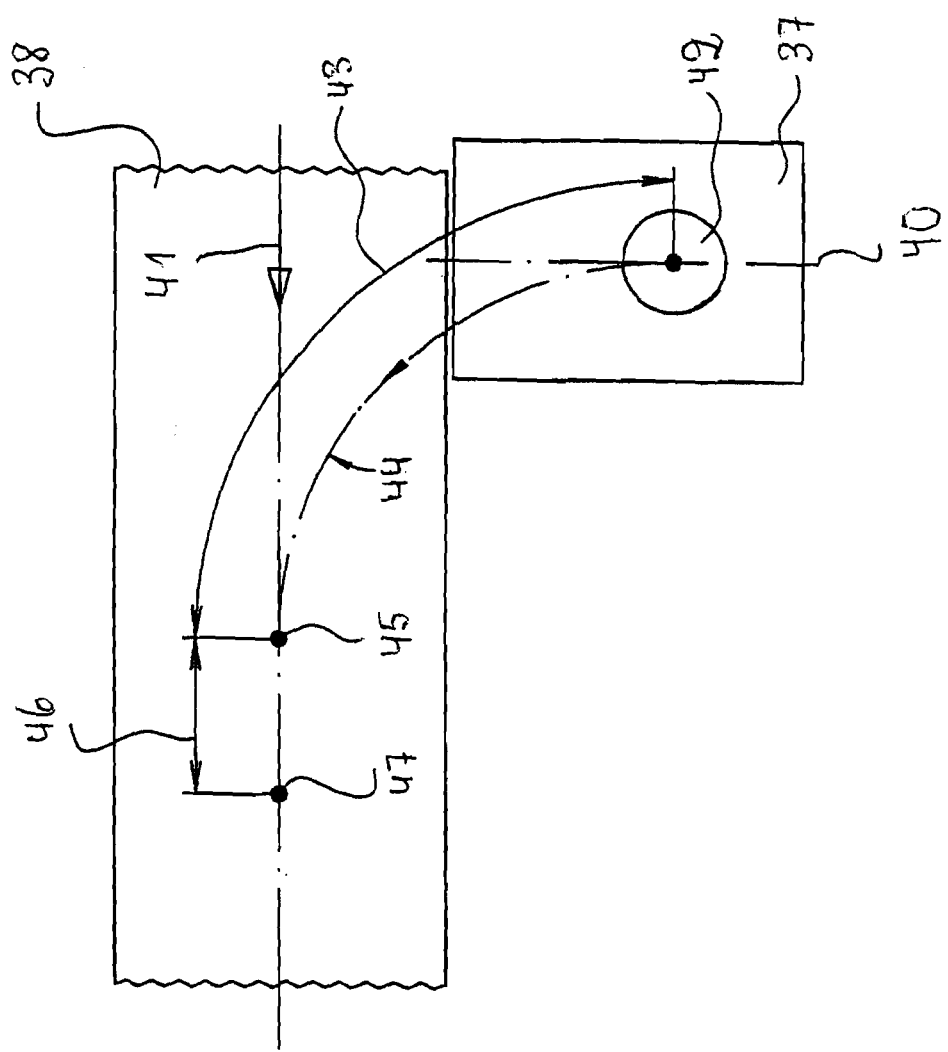
FIG. 3 shows a graphical illustration of the pushing movement to be carried out by the device in accordance with FIG. 1.

In order to describe the pushing movement to be carried out by this device, reference is made hereinunder in particular to FIG. 3.

Groups of, in each case, three glass objects or hollow glass objects are set down periodically on the dead plate 37 along a line 40 which extends at a right angle to the center line of the conveyor belt 38 moving uniformly in the direction 41 at a defined speed. A glass object 42 brought onto the dead plate 37 is shown, merely by way of example, in its starting position, i.e. at the beginning of a pushing movement.

The pushing movement by means of the pusher 5 is applied following a curved path 43 of a path curve 44, wherein the pushing fingers 39 lie against the glass objects 42 and wherein the path curve 44 is led tangentially to a contact point 45 in the direction 41 of the movement of the conveyor belt 38. The glass objects 42 are displaced—specifically at the same speed as the conveyor belt 38—subsequently to the contact point 45 by the pusher 5 by a further linear path element 46 of the path curve 44, therefore in the same direction as the conveying direction of the conveyor belt 38 up to a release point 47 in which the pusher 5 is released from the glass objects. The pusher 5 is then released from the glass objects 42 in order to be returned in the direction of the dead plate 37 in order to introduce a new working cycle.

The partial movements, which are required to carry out the cyclical movement of the pusher 5, which comprises the illustrated path curve 44 consisting of a curved and a straight part are generated by actuation of the three electric motors 1 to 3, the superimposition of these partial movements forming the overall movement of the pusher 5.

These partial movements are the rotation of the shaft 12, effected by the electric motor 1, and therefore of the crank arm 6 about the axis 9, the rotation of the sleeve 20, effected by the electric motor 2, and therewith of the shaft 12 about the axis 19, and the rotation of the annular element 28 effected by the electric motor 3 about the axis 9 and therefore of the pusher 5 about the axis 7 relative to the crank arm 6.

REFERENCE LIST 1 electric motor
2 electric motor
3 electric motor
4 housing
5 pusher
6 crank arm
7 axis
9 axis
10 roller
11 roller bearing
12 shaft
13 toothed wheel
14 shaft
15 roller bearing
16 toothed wheel
17 toothed wheel
18 cantilever
19 axis
20 sleeve
21 roller bearing
22 roller bearing
23 region
24 toothed crown
25 roller bearing
26 toothed wheel
27 toothed wheel
28 annular element
29 axis
30 push rod
31 axis
32 sheet metal hood
33 upper part
34 cover plate
35 opening
36 seal
37 dead plate
38 conveyor belt
39 pushing finger
40 line
41 direction
42 glass object
43 path
44 path curve
45 contact point
46 path element
47 release point
48 part
49 driven shaft
50 driven shaft
51 driven shaft

The invention claimed is:

1. Device for pushing glass objects from a dead plate of a section of an I.S. (individual section) glassware forming machine onto a conveyor belt moving in a direction, comprising:
  a pusher which is arranged to push the glass objects from the dead plate onto the belt, said pusher is mounted on one end of a lever so as to be able to swivel about a first vertical axis, wherein the other end of the lever is connected to a first shaft which is mounted so as to be able to swivel about a second vertical axis, and wherein the first shaft is mounted so as to be able to swivel about a fixedly disposed third vertical axis of a rotatably mounted second shaft;
  a first fixedly disposed electric motor which is in driving engagement with the first shaft;
  a second fixedly disposed electric motor which is arranged to swivel the first shaft about the third axis;
  a third fixedly disposed electric motor which is arranged to rotate the pusher about the first axis relative to said lever;

said lever comprises a crank arm which is non-rotatably connected to the first shaft; and a push rod having one end connected in an articulated manner to said pusher at a distance from the first axis so as to be able to swivel about a fourth vertical axis, the other end of said push rod is in driving engagement with the third electric motor via a fifth vertical axis, forming a four-bar chain with the crank arm and the pusher.

2. Device as claimed in claim 1, wherein the first shaft is rotatably mounted in a hollow shaft which is rotatably mounted in a sleeve, wherein said sleeve is fixedly connected to a cantilever which is non-rotatably connected to the second shaft, and wherein the second shaft is in driving engagement with the second electric motor.

3. Device as claimed in claim 1 wherein the third electric motor is in driving engagement with the hollow shaft via a first spur-gear transmission, wherein the hollow shaft is fixedly connected to the articulation point of the push rod defined by the fifth axis.

4. Device as claimed in claim 3, wherein the first spur-gear transmission comprises a toothed wheel supported by a driven shaft of the third electric motor, a second toothed wheel mounted on the second shaft so as to be able to rotate relative thereto, and a toothed crown fixedly connected to the hollow shaft.

5. Device as claimed in claim 1 wherein the first electric motor is in driving engagement with the first shaft via a second spur-gear transmission.

6. Device as claimed in claim 5, wherein the second spur-gear transmission comprises a toothed wheel supported by a driven shaft of the first electric motor, a second toothed wheel mounted on the second shaft so as to be able to rotate relative thereto, and a third toothed wheel non-rotatably connected to the first shaft.

7. Device as claimed in claim 1 wherein a driven shaft of the second electric motor extends coaxially to the second shaft.

8. Device as claimed in claim 1, further comprising a housing having an upper part which has an upper side comprising a cover plate, the sleeve is received in an opening of the cover plate, and the cover plate can be rotated together with the sleeve about the third axis.

9. Device as claimed in claim 8, wherein the housing has a cover-like part supporting the first, second and third electric motors.

10. Device as claimed in claim 8 wherein the housing has a lower part comprising a sheet metal hood and receiving the first, second and third electric motors.

11. Device as claimed in claim 8 wherein the upper part is formed in a closed manner and receives transmission parts as well as oil filling.

12. Device as claimed in claim 8 wherein the upper part comprises a cast part.

13. Device as claimed in claim 9 wherein the cover-like part comprises a cast part.

14. Device as claimed in claim 9 wherein the first, second and third electric motors are held in the cover-like part in a side-by-side arrangement.

15. Device as claimed in claim 8 wherein the housing extends below a level of the dead plate.

16. Device as claimed in claim 2 wherein the third electric motor is in driving engagement with the hollow shaft via a first spur-gear transmission, wherein the hollow shaft is fixedly connected to the articulation point of the push rod defined by the fifth axis.

17. Device as claimed in claim 16 wherein the first spur-gear transmission comprises a toothed wheel supported by a driven shaft of the third electric motor, a second toothed wheel mounted on the second shaft so as to be able to rotate relative thereto, and a toothed crown fixedly connected to the hollow shaft.

18. Device as claimed in claim 2 wherein the first electric motor is in driving engagement with the first shaft via a second spur-gear transmission.

19. Device as claimed in claim 18 wherein the second spur-gear transmission comprises a toothed wheel supported by a driven shaft of the first electric motor, a second toothed wheel mounted on the second shaft so as to be able to rotate relative thereto, and a third toothed wheel non-rotatably connected to the first shaft.

20. Device as claimed in claim 2 wherein a driven shaft of the second electric motor extends coaxially to the second shaft.

* * * * *